US008679654B2

(12) United States Patent
Nemoto et al.

(10) Patent No.: US 8,679,654 B2
(45) Date of Patent: Mar. 25, 2014

(54) MAGNETIC RECORDING MEDIUM INCLUDING PLURAL FEPT ALLOY LAYERS INCLUDING CARBON, OXIDES OR NITRIDES

(75) Inventors: Hiroaki Nemoto, Odawara (JP); Ikuko Takekuma, Yokohama (JP); Kimio Nakamura, Fujisawa (JP); Junichi Sayama, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 109 days.

(21) Appl. No.: 13/372,116

(22) Filed: Feb. 13, 2012

(65) Prior Publication Data

US 2012/0225325 A1    Sep. 6, 2012

(30) Foreign Application Priority Data

Mar. 2, 2011   (JP) .................... 2011-045496

(51) Int. Cl.
*G11B 5/66*  (2006.01)
*G11B 5/65*  (2006.01)
*C22C 38/00* (2006.01)
*C22C 5/04*  (2006.01)

(52) U.S. Cl.
CPC  *G11B 5/653* (2013.01); *G11B 5/66* (2013.01); *C22C 38/002* (2013.01); *C22C 2202/02* (2013.01); *C22C 5/04* (2013.01)
USPC ...... 428/829; 428/830; 428/836.2; 428/836.3

(58) Field of Classification Search
None
See application file for complete search history.

(56) References Cited

U.S. PATENT DOCUMENTS

| 2007/0230051 A1 | 10/2007 | Ajan et al. |
| 2009/0068500 A1 | 3/2009 | Kong et al. |
| 2009/0197119 A1* | 8/2009 | Kong et al. ................... 428/800 |
| 2012/0052330 A1* | 3/2012 | Takekuma et al. ............ 428/829 |
| 2013/0209835 A1* | 8/2013 | Qui et al. ...................... 428/829 |

FOREIGN PATENT DOCUMENTS

| JP | 2007-273056 A | 10/2007 |
| JP | 2009-070540 | 4/2009 |
| JP | 2009-158054 | 7/2009 |
| JP | 2009158053 A * | 7/2009 |
| JP | 2009-187652 | 8/2009 |

OTHER PUBLICATIONS

JP Abstract Translation of JP-2009-158053-A (JPO Pat-No. JP02009158053A) [published Jul. 2009].*

(Continued)

*Primary Examiner* — Kevin Bernatz
(74) *Attorney, Agent, or Firm* — Foley & Lardner LLP (57) ABSTRACT

Surface flatness of magnetic recording medium to which a magnetic recording layer made of $L1_0$ FePt magnetic alloy thin film, with distance between a magnetic head and a magnetic recording medium sufficiently reduced. The magnetic recording layer includes: magnetic layers containing a magnetic alloy including Fe and Pt as principal materials; and one non-magnetic material selected from carbon, oxide and nitride. The first magnetic layer disposed closer to a substrate has a granular structure in which magnetic alloy grains including FePt alloy as the principal material are separated from grain boundaries including the non-magnetic material as the principal material. The second magnetic layer disposed closer to the surface than the first magnetic layer is fabricated so as to have a homogeneous structure in which an FePt alloy and the non-magnetic material are mixed in a state finer than diameters of the FePt magnetic alloy grains in the first magnetic layer.

10 Claims, 4 Drawing Sheets

(56) References Cited

OTHER PUBLICATIONS

Machine Translation of JP 2009-158054-A [published Jul. 2009].*
Chen et al., "Low temperature deposited $L1_0$ FePt-C (001) films with high coercivity and small grain size," Applied Physics Letters, 2007, pp. 132506-1-132506-3, vol. 91.
Nemoto et al., "Designing magnetics of capped perpendicular media with minor-loop analysis," J Magnetism and Magnetic Materials, 2008, pp. 3144-3150, vol. 320.
Seki et al., "Microstructure and magnetic properties of $FePt-SiO_2$ granular films with Ag addition," J Applied Physics, 2008, pp. 023910-1-023910-7, vol. 103.
Sukeda et al., "Thermally Assisted Magnetic Recording on Flux-Detectable RE-TM Media," IEEE Transactions on Magnetics, Jul. 2001, pp. 1234-1238, vol. 37, No. 4.
Weller et al., "High K$u$ Materials Approach to 100 Gbits/in$^2$," IEEE Transactions on Magnetics, Jan. 2000, pp. 10-15, vol. 36, No. 1.
Wu et al., "Low-temperature ordering of (001) granular FePt films by inserting ultrathin $SiO_2$ layers," Applied Physics Letters, 2007, pp. 072502-1-072502-3, vol. 91.
Zhang et al., "$L1_0$-ordered high coercivity (FePt)Ag—C granular thin films for perpendicular recording," Journal of Magnetism and Magnetic Materials, Sep. 2010, vol. 322, No. 18; pp. 1-20.
Zhu et al., "Microwave Assisted Magnetic Recording," IEEE Transactions on Magnetics, Jan. 2008, pp. 125-131, vol. 44, No. 1.

* cited by examiner

MAGNETIC RECORDING MEDIUM INCLUDING PLURAL FEPT ALLOY LAYERS INCLUDING CARBON, OXIDES OR NITRIDES

CLAIM OF PRIORITY

The present application claims priority from Japanese patent application JP P2011-045496 filed on Mar. 2, 2011, the content of which is hereby incorporated by reference into this application.

BACKGROUND OF THE INVENTION

1. Field of the Invention

The present invention relates to magnetic recording and assisted magnetic recording, and particularly to a magnetic recording medium capable of realizing an areal recording density of at least 150 gigabits per square centimeter and a method of manufacturing the same.

2. Background Art

Hard disk drives (HDDs) are indispensable devices for usage requiring large-capacity information recording in computers and consumer-electronics products. In the future too, needs for large-capacity recording will be high. It is required to increase the areal recording densities of recording media in order to realize large capacity while serving the needs for savings in space and energy. Presently, approaches to high density by improvement in perpendicular magnetic recording have been attempted. However, according to conventional perpendicular magnetic recording, it is estimated that a feasible maximum areal recording density is 150 Gbit/cm$^2$ (1 Tbit/inch$^2$). The reason why the areal recording density has the limit is interpreted to be due to a fundamental principle of recording according to which a medium suitable for high density recording deteriorates in thermal stability. High density magnetic recording requires magnetic grains forming a magnetic recording medium to be finer to form highly accurate recording bit boundaries (magnetic transition region). However, in a case of making the magnetic grains fine, the magnetic energy $K_u V$ that stabilizes magnetization directions of respective grains cannot retain a magnitude sufficient against thermal energy $k_B T$ as a disturbance. Accordingly, a phenomenon occurs that recorded magnetization information deteriorates (thermal decay of magnetization) immediately after recording. Here, $K_u$, $V$, $k_B$, and $T$ are a uniaxial magnetic anisotropy energy, a magnetic grain volume, the Boltzmann constant, and the absolute temperature, respectively.

Improvement in areal recording density while maintaining thermal stability requires use of a magnetic recording layer having a high magnetic anisotropy energy $K_u$. As described in IEEE Trans. Magn., vol. 36, p. 10 (2000) and the like, an $L1_0$ FePt ordered alloy is a material having perpendicular magnetic anisotropy energy $K_u$ higher than that of existing CoCrPt alloys, and receives attention as a next-generation magnetic recording layer. Use of the $L1_0$ FePt ordered alloy as a magnetic recording layer absolutely necessitates reduction in exchange interaction between crystalline grains. Accordingly, in recent years, many attempts of adding a non-magnetic material, such as MgO, SiO$_2$ or C, to an $L1_0$ FePt ordered alloy to form granular structure have been reported. Here, the granular structure represents a structure including magnetic crystalline grains made of an FePt alloy and grain boundaries made of surrounding non-magnetic material.

However, recording cannot be made on the magnetic recording layer material having such a high $K_u$, using an existing magnetic head. This is because a soft magnetic material used for a magnetic writer pole has the maximum value of saturated magnetic flux density B of approximately 2.5 T, and thus the magnitude of the magnetic field generated by the magnetic writer pole is limited. Thus, assisted magnetic recording, or a new concept of magnetic recording, has been proposed. Presently, two assisting schemes, laser heating and microwave irradiation schemes have mainly been proposed, and referred to as thermally assisted magnetic recording (IEEE Trans. Magn., vol. 37, p. 1234 (2001)) and microwave assisted magnetic recording (IEEE Trans. Magn., vol. 44, p. 125 (2008)), respectively. These assisted magnetic recording schemes irradiate a magnetic recording layer with assist energy to facilitate magnetization reversal and then form a recording bit using a magnetic field generated by the magnetic writer pole.

Since FePt has a disordered fcc structure as a metastable phase in addition to the $L1_0$ ordered structure, this requires to be subjected to an ordering process by heat treatment. It has been known that, the higher the degree of ordering (degree of ordering S), the higher the magnetic anisotropy energy is obtained. Improvement in degree of ordering requires heat treatment. The methods therefor are broadly divided into a method of heating after forming a film of an FePt alloy (post annealing method), and a method of forming a film of an FePt alloy on a preheated substrate (substrate heating method). In a case of granulation by adding a nonmetal element to an FePt alloy thin film, a fabrication method is required to be determined on the basis of any of heating methods as a premise.

An example of a fabrication method using the post annealing method is disclosed in Appl. Phys. Lett., vol. 91, p. 072502 (2007). According to this document, a post annealing process is applied to a multilayer film structure in which a periodic structure including an Fe layer, Pt layer, and a SiO$_2$ layer as a grain boundary material is repeatedly stacked n times, thereby obtaining $L1_0$ FePt alloy magnetic thin film having a granular structure. The diameters of the FePt magnetic grains at this time are approximately 6 nm. Accordingly, the grains can be applied to high density magnetic recording. On the other hand, an example of the fabrication method using the substrate heating method is disclosed in Appl. Phys. Lett., vol. 91, p. 132506 (2007) and J. Appl. Phys., vol. 103, p. 023910 (2008). These documents have reported that a granular structure can be obtained without using the periodically laminated structure such as in Appl. Phys. Lett., vol. 91, p. 072502 (2007), and the diameters of the grains can relatively easily be controlled according to a heating temperature of a substrate and an amount of addition of non-magnetic material. Various oxides and carbon have been discussed as a grain boundary material. It has been understood that C is a specific grain boundary material which can realize an excellent granular structure among these materials. J. Magn. Magn. Mater., vol. 322, p. 2658 (2010) discloses an example of fabricating an $L1_0$ FePt alloy magnetic thin film which realizes both a favorable granular structure with the diameters of magnetic grains of about 6 nm and a high coercivity Hc of at least 3 T (30 kOe).

SUMMARY OF THE INVENTION

On the basis of the technical requirements disclosed so far, the inventors have discussed methods of fabricating an $L1_0$ FePt alloy magnetic thin film, and surveyed the magnetic characteristics and fine structure thereof. In some fabrication conditions subjected to optimization, thin films having a favorable granular structure and high degree of ordering S and coercivity Hc can be obtained. However, in many cases, these FePt alloy magnetic thin films are inferior in surface flatness, and have a surface roughness, which is a root mean square (hereinafter, RMS) roughness of 2 nm and a maximum roughness of about 10 nm, according to an evaluation using atomic force microscopy (AFM). In recent magnetic recording (including assisted magnetic recording), a recording and reproduction element of a magnetic head is brought into close vicinity of a distance (spacing) of 1 to 2 nm to the magnetic recording medium, and recording and reproducing operations are made at sufficiently high resolution, thereby realizing high density. However, in the case of using the magnetic recording medium having the surface roughness as described above, it is impossible to bring the magnetic head into close vicinity to the magnetic recording medium. Accordingly, recording and reproducing operations cannot be performed at a resolution suitable for a high density recording. That is, from the standpoint of surface flatness, the FePt alloy magnetic thin film does not have characteristics applicable to a magnetic recording layer.

The present invention is made in view of the above problems. More specifically, it is an object of the present invention to provide a magnetic recording medium having magnetic anisotropy energy and diameters of magnetic grains which are sufficient to realize an areal recording density of at least 150 gigabits per square centimeters, and further having a surface flatness capable of sufficiently reducing spacing between the head and the medium.

In order to achieve the object, the proponents of the present invention have prototyped FePt alloy magnetic thin films having various types of composition and structures, and discussed the granular structures, surface flatness, degree of ordering S, and coercivity Hc. As a result, it has found that an FePt alloy magnetic thin film having characteristics to be described later allows a magnetic recording layer having characteristics satisfying the object to be obtained. It has further been found that application of thermally assisted magnetic recording to the magnetic recording medium using the magnetic recording layer of the present invention allows an areal recording density of at least 150 Gbit/cm$^2$ to be realized.

A typical magnetic recording medium disclosed in the present invention is a magnetic recording medium formed by sequentially stacking an underlayer, a magnetic recording layer and an overcoat layer on a non-magnetic substrate. The underlayer is used for controlling the crystalline orientation and fine structure of the magnetic recording layer. The magnetic recording layer is made of a composite material including an FePt magnetic alloy as a principal material to which at least one non-magnetic material selected from the material group consisting of carbon (C), oxides (e.g. $SiO_2$, $TiO_2$ and $Ta_2O_5$), and nitrides (e.g. CN, SiN and TiN) is added. The magnetic recording layer is formed by combination of a process of heating the substrate after forming the underlayer and a process of forming this magnetic recording layer. The overcoat layer is for mechanically and chemically protecting the entire recording film, and is typically a thin film including carbon as the principal material. The carbon thin film has hard mechanical characteristics typified by the diamond structure, and is effective to protect the recording film formed on the substrate.

On the overcoat film, a lubricant film is formed by thinly applying a perfluoropolyether (PFPE) based lubricant. The lubricant film reduces surface energy of the recording magnetic film, thereby improving resistance to friction movement, which attains an advantageous effect of preventing the film from being destroyed in case of collision with the magnetic head or the like.

The magnetic recording medium of the present invention has the aforementioned basic structure, and the magnetic recording layer includes a plurality of magnetic layers with different types of material composition and fine structures. One of significant characteristics of the magnetic recording medium of the present invention is that these magnetic layers have fine structures different from each other. As a lower part of the magnetic recording layers (a portion close to the underlayer), a film having a granular structure is applied in which FePt magnetic alloy grains and non-magnetic grain boundaries are distinctly separated from each other. Such a magnetic layer is hereinafter referred to as an FePt granular magnetic layer. As an upper part of the magnetic recording layers (a portion close to the overcoat layer), a film having a structure is applied in which the FePt alloy material and the non-magnetic material are mixed in a scale smaller than that of the granular structure of the lower part, and the structure and composition are more homogeneous than those of the FePt granular magnetic layer and thus exerts characteristics as a continuous magnetic film.

The upper part of the magnetic recording layers having such a structure has a form analogous to that often referred to as a capping layer in the existing perpendicular magnetic recording medium. Accordingly this upper part is hereinafter referred to as an FePt capping layer. Here, the FePt capping layer of the present invention is a magnetic layer including the FePt alloy as the principal material. The FePt alloy in the FePt capping layer has an $L1_0$ crystal structure with the (001) crystal orientation identical to that of the FePt granular magnetic layer. In addition, the FePt capping layer includes an appropriate amount of non-magnetic material, as follows.

As the non-magnetic material included in the FePt capping layer, C or an oxide is preferable. In a case of adding C, the amount of addition is preferably between 7 and 18 vol. %. In a case of adding an oxide or a nitride, the amount of addition is preferably between 11 and 32 vol. %. Only in cases of adding the non-magnetic material within the above range, the homogeneous structure as described above can be obtained. In a case of the amount of addition is lower than that of the above cases, aggregation of the FePt alloy is facilitated. In a case of the amount of addition is higher than that of the above case, formation of a heterogeneous structure in which the non-magnetic material and the FePt alloy are separated from each other in a larger scale is facilitated. Accordingly, a desired homogeneous structure cannot be obtained.

JP 2009-158054 A and JP 2009-70540 A disclose an analogous structure in which a capping layer and an FePt granular layer are combined. However, the capping layers disclosed in these documents are made of Co alloy, and different in composition of magnetic material from the FePt capping layer of the present invention. The Co alloy layer has a crystal lattice of the hexagonal close-packed (hcp) structure, and a magnetization easy axis parallel to the c axis. On the other hand, the FePt alloy of the FePt granular magnetic layer has an $L1_0$ structure, and a magnetization easy axis parallel to the (001) axis. Even if the Co alloy layer is epitaxially grown on the FePt granular magnetic layer of the present invention, the Co alloy shows a magnetization easy axis direction different from that of the FePt granular magnetic layer. In this case of having the different magnetization easy axes between the layers, it is difficult to realize favorable recording and reproducing characteristics with the entire magnetic recording layer. Accordingly, it is significantly preferable to employ the FePt alloy based layer similar to that of the granular magnetic layer as the capping layer.

JP 2009-187652 A discloses a medium to which a capping layer made of an FePt alloy material is applied. However, since the FePt capping layer in this document does not make a premise of adding the non-magnetic material, this document is fundamentally different from the present invention in view thereof. According to the study by the inventors, in a case of applying a heating process to an FePt alloy layer including no non-magnetic material, the homogeneous magnetic layer without granular structure, which is intended by the present invention, cannot be obtained. Accordingly, addition of the non-magnetic material is significant characteristics of the FePt capping layer of the present invention.

Here, it is preferable the aforementioned FePt capping layer thickness be between 1 and 3 nm. A magnetic grain in the granular magnetic layer is a minimum unit of magnetization reversal in magnetic recording. As shown in J. Magn. Magn. Mater., vol. 320, p. 3144 (2008), the capping layer has an effect of controlling the exchange interaction acting between the magnetic grains to thereby improve recording and reproducing characteristics. In the FePt capping layer thicker than 3 nm, the exchange interaction acting between the granular magnetic grains is too strong. Accordingly, deterioration in recording characteristics owing to use of the capping layer is significant. Further, it has been found that the crystalline orientation of the FePt capping layer significantly deteriorates at a thickness of at least 3 nm. On the other hand, in order to effectively improve the surface flatness, it is preferable to make the FePt capping layer thickness at least 1 nm.

According to the study by the inventors, in order to form an FePt capping layer having a homogeneous structure, it is essential to adopt an appropriate film-forming process as described below. First, it is preferable to form a film of a material in which a non-magnetic material is mixed into an FePt alloy at a low temperature (around the room temperature). Formation of a film of the material on the preheated substrate facilitates crystal growth of magnetic alloy grains in which the FePt alloy is the principal material. This easily separates the FePt magnetic alloy grains from the grain boundaries made of the non-magnetic material. Accordingly, it is significantly difficult to obtain a homogeneous structure as the object. In contrast, in a case of film-forming the FePt capping layer at a low temperature (around the room temperature), a homogeneous structure in which phase separation has not progressed can be obtained. However, in film-forming at a low temperature, ordering of the FePt alloy is not developed. Accordingly, magnetic anisotropy energy required for a magnetic recording layer cannot be attained. Thus, in order to facilitate ordering of an alloy into the $L1_0$ structure in the FePt capping layer, heat treatment (post annealing process) after film deposition at a low temperature is required.

In the post annealing process, the grains of the magnetic alloy in which the FePt alloy is the principal material are prone to aggregate. As a result, the surface flatness often significantly deteriorates. Means for suppressing the aggregation is the aforementioned addition of the non-magnetic material. It has also confirmed that reduction in temperature in the post annealing process has a tendency to improve the surface flatness. Note that, in order to decrease heating temperature, it is required that the FePt alloy becomes ordered into the $L1_0$ structure at a low temperature. As effective means for reducing the annealing temperature required for ordering, a method of adding a small amount of metal, such as for instance Ag, to the FePt alloy has been known. It has been pointed out that, in a case of an FePt alloy film with less impurities (moisture etc.) formed in ultrahigh vacuum, there is a possibility that ordering develops at a relatively low temperature.

Another aspect characterizing the present invention is that magnetic recording layer includes a plurality of FePt granular magnetic layers containing different non-magnetic materials. Here, it is preferable that a first FePt granular magnetic layer near the underlayer has a higher dosage of carbon, which is a non-magnetic material, and a low dosage of other materials including oxides and nitrides, in comparison with a second FePt granular magnetic layer to be formed thereon. It is required to add, to each FePt granular magnetic layer, an amount of non-magnetic material necessary to granulate the FePt alloy. It is preferable that the total amount of addition is between 20 and 55 vol. %, irrespective of the type and ratio of the non-magnetic materials. If the amount of addition is below this range, the diameters of the magnetic grains in the magnetic recording layer become large, so that it is incapable of obtaining sufficient signal quality at a high areal recording density. In contrast, if the amount of addition is above this range, the volume ratio of the FePt magnetic alloy in the magnetic recording layer is small, so that it is difficult to obtain a signal strength required for magnetic reproducing.

Among non-magnetic grain boundary materials, carbon especially has a strong effect of isolating the FePt magnetic alloy grains. Accordingly, addition of much carbon to the first FePt granular magnetic layer facilitates acquisition of a favorable granular structure. However, addition of carbon produces a side effect of increasing surface roughness of the FePt granular magnetic layer. On the other hand, although oxides and nitrides have weak effects of isolating the FePt magnetic alloy grains, relatively high surface flatness can be maintained. Accordingly, much addition thereof to the second FePt granular magnetic layer allows the surface flatness of the entire FePt granular magnetic layer to be improved. Oxides and nitrides of Al, Cr, Hf, Mg, Nb, Si, Ta, Ti, V, Zr, etc. can be considered as oxides and nitrides to be applied to the FePt granular magnetic layer.

The aforementioned FePt capping layer can be applied to the composite FePt granular magnetic layer to combine them together. The combination of both techniques further improves surface flatness.

The magnetic recording medium of the present invention enables the surface flatness to be improved without degrading the magnetic anisotropy energy, fine granular structure and magnetic recording characteristics of the magnetic recording layer in which the FePt alloy is the principal material. The improvement of the surface flatness of the magnetic recording layer reduces spacing between the recording and reproducing element of the magnetic head and the magnetic recording medium, which facilitates recording and reproducing operations at a high resolution. As a result, application of assisted magnetic recording to the magnetic recording medium of the present invention allows magnetic recording to be realized at a high areal recording density of at least 150 gigabits per square centimeter.

Problems, configurations and advantageous effects other than the above description will become apparent according to following description of embodiments.

DETAILED DESCRIPTION OF THE PREFERRED EMBODIMENTS

Exemplary operations and advantageous effects of the present invention will hereinafter be described, with reference to drawings, on the basis of specific embodiments to which the present invention is applied. These embodiments are described for the sake of representing a general principle of the present invention, and do not limit the present invention at all.

[Embodiment 1]

Figure 1:
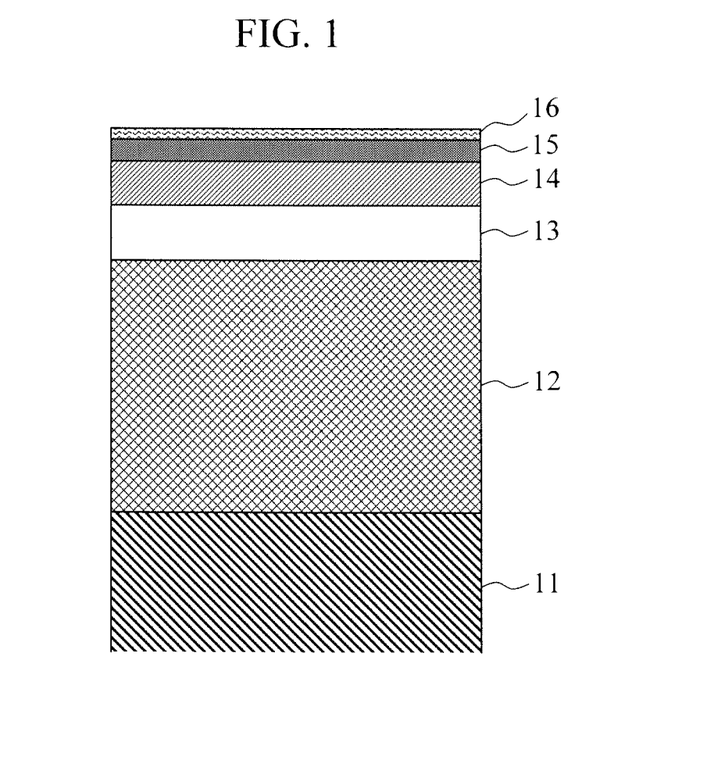
FIG. 1 is a drawing showing a laminated structure of a magnetic recording medium according to Embodiment 1.

FIG. 1 shows a schematic drawing of cross section of a magnetic recording medium of this embodiment. The magnetic recording medium of this embodiment has a structure in which, a NiTa alloy layer 12, a MgO oxide layer 13, a magnetic recording layer 14, and a carbon overcoat layer 15 are sequentially formed on a heat resistant glass substrate 11. The heat resistant glass substrate 11 is formed into a toroidal shape to fit for a 2.5-inch-type HDD, and washed before film-forming. A substrate 11 is introduced into an in-line vacuum sputtering apparatus, and each layer is formed using DC and RF sputtering.

The NiTa alloy layer 12 is formed to have a thickness of 100 nm using a $NiTa_{38}$ target (the numerical subscript denotes an atomic percent of a ratio of element dosage into the alloy; likewise thereafter). The NiTa alloy layer 12 has an amorphous structure. According to an electron diffraction analysis, a hollow diffraction ring can be observed. The NiTa alloy layer 12 is resistant to crystallization even at a high temperature, and maintains favorable flatness after heat treatment for ordering. This has an advantageous effect of improving adherence of the entire laminated films to the glass substrate 11. Further, an increase in thickness of the NiTa alloy layer 12 up to about 100 nm obtains an effect of absorbing energy from an infrared heater used for heating the substrate and storing the absorbed heat. Accordingly, application of this NiTa alloy layer 12 obtains an advantage of facilitating temperature control of the surface of the substrate without affecting the crystal orientations of the underlayer 13 and the magnetic recording layer 14. An analogous effect can be realized by adopting an alloy including Ni as a main ingredient and at least one element of Nb and Ta. It is preferable that the amount of addition of Nb be between 20 and 70 at. % and the amount of addition of Ta be between 30 and 60 at. %. Application of a soft magnetic material, instead of these alloys, can obtain a soft magnetic underlayer (SUL) effect in perpendicular magnetic recording. Application of $FeCo_{34}Ta_{10}Zr_5$ alloy is considered as that of the soft magnetic material.

The MgO oxide layer 13 is formed so as to have the B1 type (rock salt type) crystal structure and the (100) crystal orientation ([100] axis is oriented perpendicularly to the film surface). The MgO oxide is a material often used for the sake of orienting the $L1_0$ FePt ordered alloy crystal, which is applied to the magnetic recording layer 14, in the (001) crystal orientation. The MgO oxide layer 13 can be replaced with another material having an analogous effect of controlling the crystal orientation. For instance, $SrTiO_3$ having the perovskite structure, TiN having the same rock salt structure, a metal or alloy including at least one of Ag, Au, Cu, Ir, Pt, Pd having the fcc structure, or a metal or alloy including at least one of Cr and Mo having the bcc structure can be used. A laminated underlayer combining these underlayers may be used.

Figure 2:
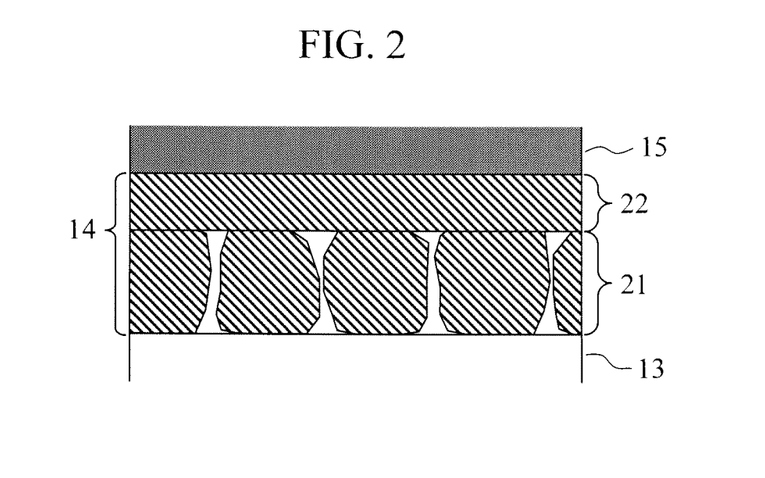
FIG. 2 is a drawing showing a laminated structure of the magnetic recording layer of the magnetic recording medium according to Embodiment 1.

Next, the material composition, the film-forming method, and the fine structure of the magnetic recording layer 14, which characterize the magnetic recording medium of the present invention, will be described in detail. As shown in FIG. 2, the magnetic recording layer 14 of this embodiment includes two-layered structures, which are an FePt granular magnetic layer 21 and an FePt capping layer 22 formed thereon.

The FePt granular magnetic layer 21 is formed using a sputtering target made by sintering $Fe_{45}Pt_{45}Ag_{10}$ alloy and carbon (C). The C dosage into this target is a volumetric ratio of approximately 35 vol. %. Here, in the case of representing the dosage of C by atomic ratio x (at. %) and volumetric ratio y (vol. %), respective notations are converted into each other according to a following equation.

$$y=0.00322x^2+0.619x$$

First, the substrate on which layers up to the MgO oxide layer 13 having been formed is transferred to the heating chamber, and heated on both surfaces using the infrared heater. After completion of heating, this substrate is immediately transferred to a film deposition chamber. The FePt granular magnetic layer 21 with a thickness of 4 nm is formed by the DC sputtering method using the FePtAg-35 vol. % C target. The temperature of the substrate during film deposition, which is estimated using a radiation thermometer installed in the heating chamber, is approximately 450° C.

Subsequently, the FePt capping layer 22 is formed using two sputtering targets, which are a target made only of an $Fe_{45}Pt_{45}Ag_{10}$ alloy and a target made by sintering the same alloy and the carbon (C). The dosage of C into the latter target is 35 vol. %.

After film deposition of the FePt granular magnetic layer 21, the substrate is kept in the vacuum chamber for 300 seconds until the temperature of the substrate having once been heated decreases. After it is confirmed that the temperature of the substrate decreases to the room temperature, the two targets are subjected to simultaneous discharge to thereby form FePt capping layer 22 of a thickness in a range from 1 to 6 nm by the DC sputtering method. Here, sputtering voltages applied to the two respective targets are changed. This changes the dosage of C included in the FePt capping layer 22 in a range between 0 and 25 vol. %.

After sputtering film deposition, the substrate is moved into the heating chamber again, and subjected to a post annealing process. The heating temperature during the post annealing process is 500° C., and the annealing time is 120 seconds.

After forming the magnetic recording layer 14, the substrate is kept again until the temperature decreases, and the carbon overcoat layer 15 is formed. The carbon overcoat layer 15 is a highly rigid film which has a carbon with a thickness of 3.5 nm as a principal material. This is made by the DC sputtering method in which the carbon target is subjected to discharge in a mixed gas of argon and nitrogen having a total pressure of 1.5 Pa and a nitrogen gas ratio of 10%.

As to a sample of the magnetic recording medium on which recording and reproducing are to be evaluated, a liquid lubrication film 16 with a thickness of approximately 1 nm is formed on the upper part of the carbon overcoat layer 15. After completion of sputtering film formation, the substrate 11 is taken out of the vacuum chamber. A PFPE-based liquid lubricant is applied by the dip method. Further, the surface of the medium is burnished with tape or the like to remove abnormal protrusions and foreign substances.

Figure 3:
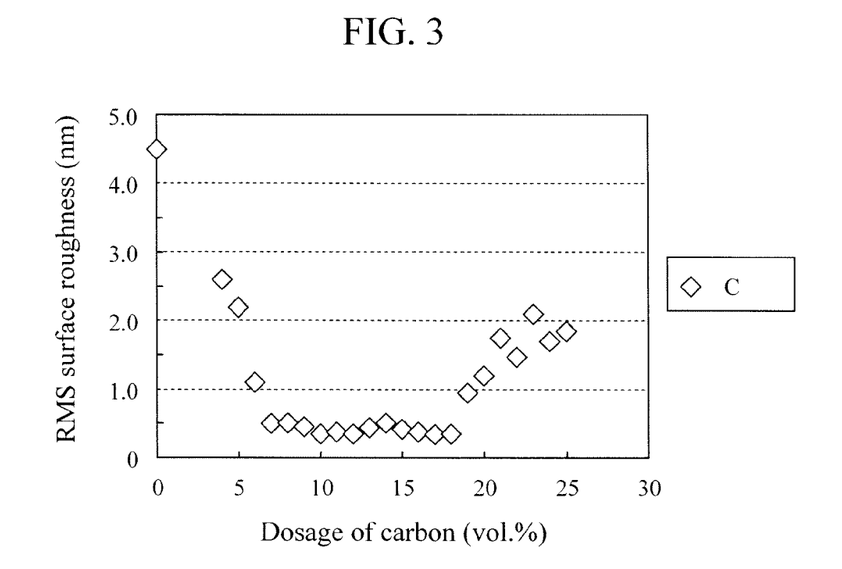
FIG. 3 is a drawing showing a relationship between RMS surface roughness and a dosage of carbon into FePt capping layer of the magnetic recording medium according to Embodiment 1.

The surface roughness of the magnetic recording medium of this embodiment having been made according to the procedures is discussed. FIG. 3 shows a relationship between RMS surface roughness measured using atomic force microscopy (AFM) and the C dosage into the FePt capping layer 22. Here, the thickness of the FePt capping layer 22 is 2 nm. In a case where the FePt capping layer 22 is a sample which does not include C, the RMS surface roughness is approximately 4.5 nm, which is significantly high. This is because the FePt alloy causes aggregation to form clusters in the post annealing process. According to observation of the surface and cross-sectional structures using a transmission electron microscope (TEM), significantly large FePt magnetic alloy grains with diameters extending for several tens of nanometers are observed.

As C is added to the FePt capping layer 22, the RMS surface roughness tends to decrease. As shown in FIG. 3, in a case where the amount of addition of C is in a range between 7 and 18 vol. %, the roughness decreases below 0.5 nm. According to observation of the surface and cross-sectional structures of the magnetic recording medium in this range, the FePt capping layer 22 is a continuous film having a homogeneous structure. Here, it can be considered that the homogeneous structure is in a state where significantly fine grains of C with sizes of 2 nm or less are homogeneously dispersed in the FePt capping layer. Such addition of the appropriate amount of C suppresses aggregation of the FePt alloy in the post annealing process. As a result, the surface flatness is improved. In a range of the amount of addition of C less than 7 vol. %, it is considered that the aggregation is not sufficiently suppressed.

In a range of the amount of addition of C more than 18 vol. %, the homogeneous structure disappears again. According to TEM observation, a structure in which C sections and FePt alloy sections are separated from each other is observed. In a case where the amount of C is excessive, C becomes large aggregations. Accordingly, it is considered that the homogeneousness of the FePt capping layer 22 deteriorates. As shown in FIG. 3, the RMS surface roughness in this case is about 1.5 to 2.0 nm, which is large. Accordingly, the surface flatness suitable as the magnetic recording medium cannot be obtained.

Figure 4:
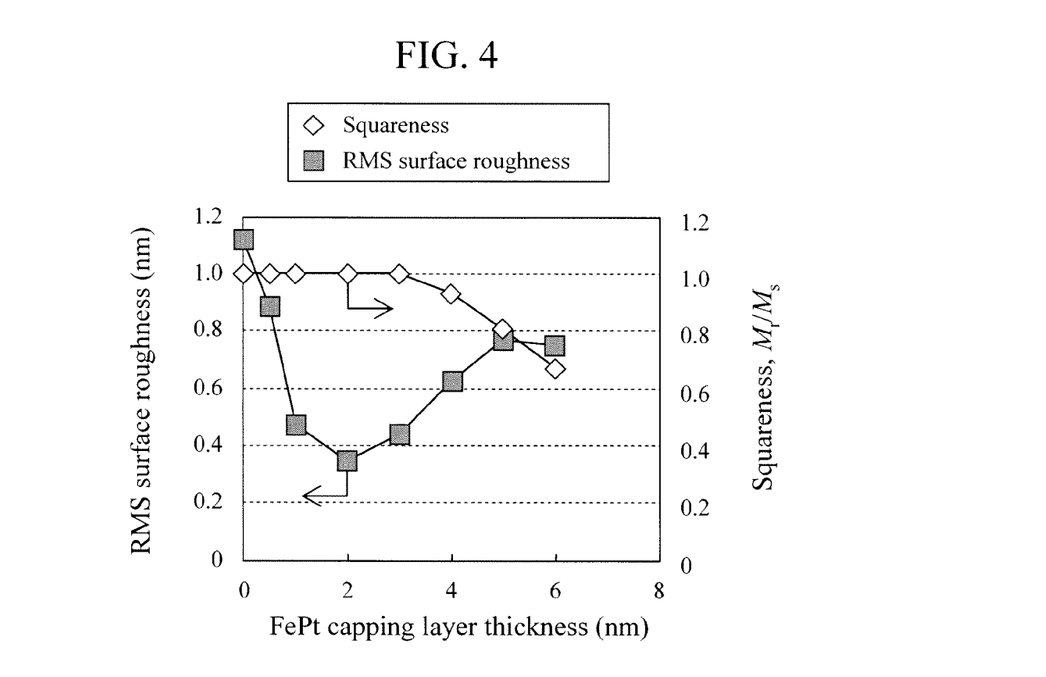
FIG. 4 is a drawing showing the dependence of squareness S of a magnetic hysteresis loop and RMS surface roughness on FePt capping layer thickness of the magnetic recording medium according to Embodiment 1.

Next, the C dosage into the FePt capping layer 22 is set to 12 vol. %. Effects of the capping layer thickness are tested. FIG. 4 shows dependence of squareness S in a hysteresis loop measured by a Kerr-effect magnetometer and RMS surface roughness on FePt capping layer thickness. As shown in FIG. 4, when the capping layer is formed into a thickness of 1 nm, the RMS surface roughness is reduced to 0.44 nm, which is in a level permissible as the magnetic recording medium. On the other hand, the FePt capping layer 22 is increased more than 3 nm, the squareness S decreases from 1. The decrease in squareness S is related to the fact that the magnetization easy axis of the FePt capping layer 22 deviates from the direction perpendicular to the film surface. According to an X-ray diffraction profile, it is confirmed that, in a sample with a thickness of the FePt capping layer 22 more than 3 nm, FePt magnetic alloy grains with the (111) crystal texture appear. Further, in the capping layer having this (111) crystal texture, the surface flatness is slightly deteriorated accordingly. As described above, it has become apparent that, in the present invention, the thickness of the FePt capping layer 22 is set between 1 and 3 nm, which obtains the magnetic recording medium having a favorable surface flatness and magnetization easy axis direction (crystalline orientation).

As described above, in this embodiment, the FePt capping layer 22 is formed around room temperature, and subsequently subjected to the post annealing process. Instead of this film-forming method, a medium of Comparative example 1 is fabricated to which a method of depositing the FePt capping layer 22 on a substrate preheated to 450° C. is applied as with the FePt granular magnetic layer. Here, the thickness of the FePt capping layer 22 is 2 nm, and the C dosage is 12 vol. %. Table 1 shows the RMS surface roughness of the media of Embodiment 1 and Comparative example 1 which have the same thickness and composition of the capping layer.

TABLE 1

| | RMS surface roughness (nm) | Recording bit length (nm) | Recording Width (nm) | Estimated areal recording density (Gbits/cm$^2$) |
|---|---|---|---|---|
| Embodiment 1 | 0.38 | 20.9 | 50 | 189 |
| Comparative example 1 | 1.2 | 29.3 | 58 | 107 |

The RMS surface roughness of Embodiment 1 is 0.38 nm, which is favorable. In contrast, the RMS surface roughness of Comparative example 1 is 1.2 nm, which is significantly high. A TEM observation of the capping layer of Comparative example 1 confirms a distinct granular structure. It can be considered that, in the FePtAg—C alloy thin film having been formed on the substrate at high temperature, the capping layer with a homogeneous structure cannot be obtained because crystal growth of FePt magnetic alloy grains develops and separation between the FePt magnetic alloy grains and C grain boundaries advances.

Figure 5:
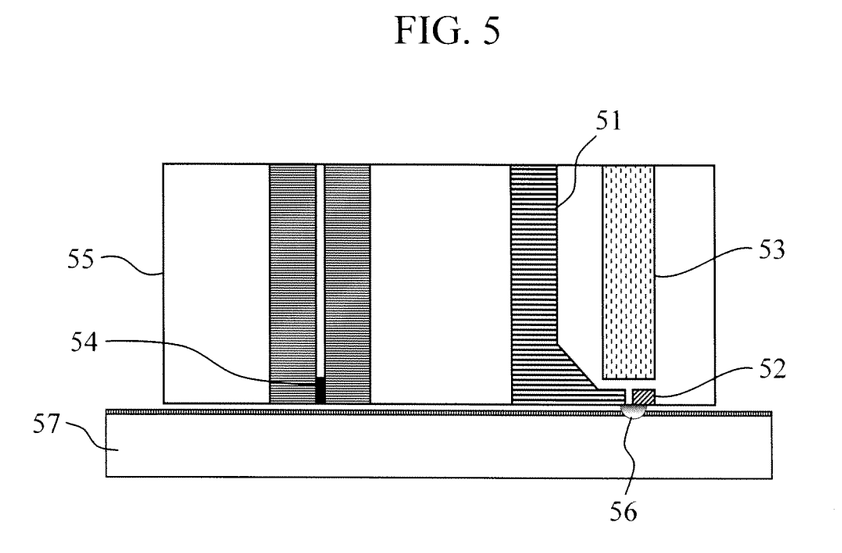
FIG. 5 is a schematic cross-sectional drawing of a main part of a thermally assisted magnetic recording head used for evaluation of recording and reproducing characteristics of thermally assisted magnetic recording in Embodiment 1.

A recording and reproducing experiment is performed on media of Embodiment 1 and Comparative example 1, which are identical to each other in thickness and composition of the capping layer, using a thermally assisted magnetic recording head. FIG. 5 shows a schematic drawing of cross section of the thermally assisted magnetic recording head. The thermally assisted magnetic recording head includes: a main magnetic writer pole 51 generating a recording magnetic field; a near field light emitting element 52 built adjacent to the main magnetic writer pole 51; and a waveguide 53 guiding laser light to the near field light emitting element 52. In a manner separated from these elements for recording, the head further includes a reproducing element 54 which uses a tunnel magnetoresistance effect. The recording and reproducing element is built in a slider body 55 together with electrodes and so on. Further, the slider body 55 is stuck on the tip of a head suspension. Then, this is used as the thermally assisted magnetic recording head. When laser light introduced into the waveguide 53 causes near field light 56 in proximity to the near field light emitting element 52, the near field light 56 heats the magnetic recording medium 57. Thermally assisted magnetic recording is performed in the heated region by the main magnetic writer pole 51 being excited by a coil formed in the slider body 55. Here, geometrical width of the reproducing element is approximately 32 nm, and the diameter of the near field light 56 estimated by calculation is approximately 35 nm.

The medium of Embodiment 1 or Comparative example 1 and the thermally assisted magnetic recording head are attached to a static recording apparatus (drag tester) and, in a state where the recording and reproducing element is in close contact with the medium, the recording and reproducing experiment are performed, while changing the relative positions between the medium and the head by a piezo element. Table 1 shows results thereof. In Table 1, a recording bit length is the minimum bit length at which the signal-to-noise ratio SNR in a case of reproducing the center position of the recording track after recording becomes at least 14 dB. The recording width is a width of a recording track estimated using the reproducing head after recording. The feasible maximum areal recording density estimated with reference to these values are shown as an estimated areal recording density.

The estimated areal recording density of the medium of Embodiment 1 is approximately 189 Gb/cm$^2$. In contrast, the estimated areal recording density of the medium of Comparative example 1 is only 107 Gb/cm$^2$. Apparently, Embodiment 1 exhibited a more excellent performance. Although strict discussion is difficult because various factors are related, Table 1 shows that the recording and reproducing performance is significantly improved by reducing the RMS surface roughness. The reduction in RMS surface roughness enables the distance (spacing) between the head and the magnetic recording medium to be reduced. It has been known that the reduction in spacing is generally a factor that significantly improves the recording and reproducing performance. If it is considered that the improvement in surface flatness enables the spacing to be reduced, most of the factors of improving the performance of Embodiment 1 can be explained.

In this embodiment, for forming the FePt granular magnetic layer 21, an $Fe_{45}Pt_{45}Ag_{10}$-C composite target in which the C dosage is 35 vol. % is employed. However, as disclosed in J. Magn. Magn. Mater., vol. 322, p. 2658 (2010), it has been known that the granular structure can be obtained with various C composition ratio. In actuality, it becomes apparent that, in cases of employing different $Fe_{45}Pt_{45}Ag_{10}$-C composite targets in which the C dosages are changed to 25 and 45 vol. % for forming FePt granular magnetic layer 21, analogous effect is obtained. The amount of addition of C is not limited thereto. Instead, in a range between 20 and 55 vol. % suitable for forming the FePt granular magnetic layer, analogous effects can be obtained.

[Embodiment 2]

The magnetic recording medium of this embodiment is fabricated in the material configuration and the film forming condition identical to those of Embodiment 1 except for the FePt capping layer 22. The difference between this embodiment and Embodiment 1 is in that oxides are used, instead of C, as the non-magnetic grain boundary material added to the FePt capping layer 22.

Two sputtering targets, or a target made only of an $Fe_{45}Pt_{45}Ag_{10}$ alloy and a target formed by sintering this alloy and the oxides are used for forming the FePt capping layer 22. Three types, or $Fe_{45}Pt_{45}Ag_{10}$—$SiO_2$, $Fe_{45}Pt_{45}Ag_{10}$—$Ta_2$ and $Fe_{45}Pt_{45}Ag_{10}$—$Ta_2O_5$ are used as targets including oxides. Here, the oxide dosage into each target is 50 vol. %.

In a case of representing the dosage of $SiO_2$ in molecular ratio x(mol. %) and volumetric ratio y (vol. %), it is provided that both notations are converted into each other according to a following equation.

$$y=-0.0348x^2+2.98x$$

Likewise, in a case of $TiO_2$, it is provided that the conversion is performed according to a following equation.

$$y=-0.0180x^2+2.17x$$

Likewise, in a case of $Ta_2O_5$, it is provided that the conversion is performed according to a following equation.

$$y=-0.134x^2+5.43x$$

Figure 6:
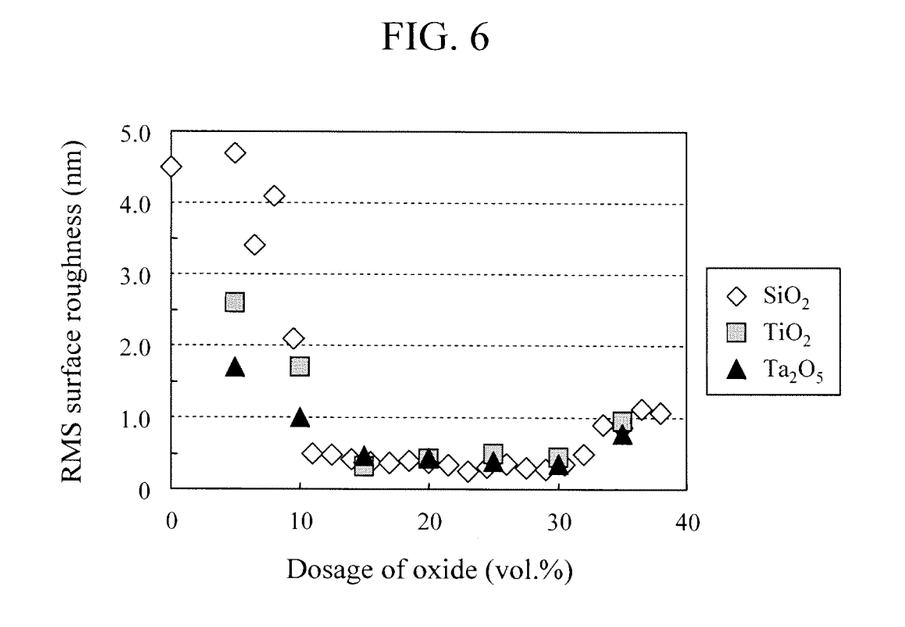
FIG. 6 is a drawing showing a relationship between RMS surface roughness and a dosage of oxide into FePt capping layer of a magnetic recording medium according to Embodiment 2.

The RMS surface roughness of the magnetic recording medium of this embodiment to which the oxides are added to the FePt capping layer 22 is discussed. FIG. 6 shows a relationship between the RMS surface roughness measured using atomic force microscopy (AFM) and the oxide dosage into the FePt capping layer 22. Here, the thickness of the FePt capping layer 22 is 2 nm.

As with the case of adding C in Embodiment 1, the RMS surface roughness tends to decrease with addition of the oxide to the FePt capping layer 22. As shown in FIG. 6, in a range between 11 and 32 vol. %, the roughness decreases to 0.5 nm or less. The surface and cross-sectional structures of the magnetic recording medium in this region are observed. The FePt capping layer 22 is a continuous film having a homogeneous structure. Here, the homogeneous structure indicates a state where the oxide is homogeneously dispersed as significantly fine grains with sizes of 2 nm or less in the FePt capping layer. This addition of the appropriate amount of oxides suppresses aggregation of the FePt magnetic alloy grains in the post annealing process. As a result, the surface flatness is improved.

In any of cases where the oxides materials added to the FePt capping layer 22 are $SiO_2$, $TiO_2$ and $Ta_2O_5$, substantially analogous tendencies are exhibited. The magnetic recording medium having a favorable surface flatness can be obtained in a range where the amount of addition of oxide is in a range approximately between 11 and 32 vol. %.

As with the case of adding C in Embodiment 1, the RMS surface roughness increases again to about 2 nm in a case where the amount of addition of oxide is increased more than 32 vol. %. According to TEM observation, large aggregations of oxide are observed. It is considered that this deteriorates the homogeneousness of the FePt capping layer 22.

The Oxide of 15 vol. % is added to the FePt capping layer 22, and a magnetic recording medium with the capping layer thickness of 2 nm is fabricated for evaluating recording and reproducing. As the oxide, $SiO_2$ is applied to Embodiment 2-1, $TiO_2$ is applied to Embodiment 2-2, and $Ta_2O_5$ is applied to Embodiment 2-3. Table 2 shows the RMS surface roughness of these embodiments and results of evaluation of recording and reproducing according to the method of Embodiment 1. Each RMS surface roughness is in a range from 0.3 to 0.5 nm. Sufficient surface flatness is maintained. The estimated areal recording density close to the value of the case of adding C can be obtained, and improvement in recording and reproducing performance due to reduction in RMS surface roughness is confirmed.

TABLE 2

|  | RMS surface roughness (nm) | Recording bit length (nm) | Recording Width (nm) | Estimated areal recording density (Gbits/cm$^2$) |
| --- | --- | --- | --- | --- |
| Embodiment 2-1 | 0.38 | 21.1 | 48 | 195 |
| Embodiment 2-2 | 0.32 | 20.2 | 51 | 192 |
| Embodiment 2-3 | 0.47 | 18.6 | 52 | 213 |

[Embodiment 3]

The magnetic recording medium of this embodiment is fabricated in conditions substantially equivalent to the laminated structure and the film-forming condition of Embodiment 1. However, an Ag element is not added to the magnetic recording layer 14 (the FePt granular magnetic layer 21 and the FePt capping layer 22); an $Fe_{50}Pt_{50}$–35 vol. % C target and an $Fe_{50}Pt_{50}$ target are used for forming magnetic recording layer 14. In a case without adding the Ag element, the temperature necessary to order the FePt alloy tends to become high. In this embodiment, the substrate temperature of the FePt granular magnetic layer 21 during film deposition is 500° C. and the post annealing process temperature after depositing the FePt capping layer 22 is 550° C., the temperatures being respectively 50° C. higher.

A medium in Embodiment 3-1 is fabricated by adding approximately 35 vol. % C to the FePt granular magnetic layer 21 and adding approximately 10 vol. % C to the FePt capping layer 22. A medium in Embodiment 3-2 is fabricated by adding approximately 35 vol. % C to the FePt granular magnetic layer 21 and adding approximately 15 vol. % C to the FePt capping layer 22. Table 3 shows the RMS surface roughness of these embodiments and results of recording and reproducing evaluation according to the method in Embodiment 1.

Although the heat treatment temperature is a little high, each RMS surface roughness is 0.5 nm or less, which can confirm an advantageous effect of improving the surface flatness by the FePt capping layer 22. The estimated areal recording density equivalent to the value in Embodiment 1 can be obtained.

TABLE 3

|  | RMS surface roughness (nm) | Recording bit length (nm) | Recording width (nm) | Estimated areal recording density (Gbits/cm²) |
|---|---|---|---|---|
| Embodiment 3-1 | 0.45 | 21.2 | 50 | 186 |
| Embodiment 3-2 | 0.48 | 21.7 | 47 | 194 |

[Embodiment 4]

Figure 7:
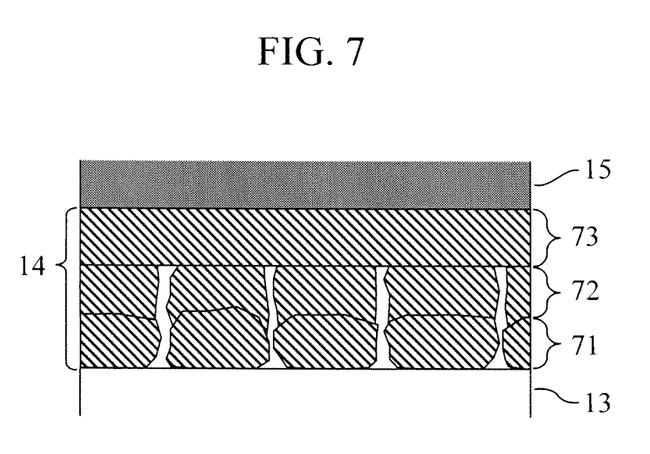
FIG. 7 is a drawing showing a laminated structure of a magnetic recording layer of a magnetic recording medium according to Embodiment 4.

The magnetic recording medium in this embodiment is fabricated in a film configuration and a film-forming condition which are equivalent to those in Embodiment 1 except for those on the magnetic recording layer 14. As shown in FIG. 7, in this embodiment, the magnetic recording layer 14 includes at least two FePt granular magnetic layers, or a first FePt granular magnetic layer 71 and a second FePt granular magnetic layer 72. The thickness of each granular magnetic layer is 2 nm.

In Embodiment 4-1, 35 vol. % C is added to the first FePt granular magnetic layer 71, and 35 vol. % $SiO_2$ is added to the second FePt granular magnetic layer 72. Immediately before depositing the first and second granular magnetic layers, the glass substrate is heated separately. The temperature during film-forming is approximately 450° C. In Embodiment 4-1, an FePt capping layer 73 is not included, and the total film thickness of the magnetic recording layer 14 is 4 nm.

As Embodiment 4-2, a medium in which an FePt capping layer 73 with a thickness of 2 nm is further stacked on the magnetic recording layer in Embodiment 4-1 is fabricated. In this case, the total film thickness of the magnetic recording layer 14 is 6 nm. A material composition and a fabrication process which are identical to those in Embodiment 1 is applied to the FePt capping layer 73. After film deposition at the room temperature, a post annealing process is performed at 500° C. for 120 seconds.

As Comparative example 2, a medium in which 35 vol. % C is added to both the first and second FePt granular magnetic layers is fabricated. As Comparative example 3, a medium in which 35 vol. % $SiO_2$ is added to the first FePt granular magnetic layer 71 and 35 vol. % C is added to the second FePt granular magnetic layer 72 is fabricated. Comparative example 3 is the medium in which the stacking order is inverted from that of Embodiment 4-1. Also in these Comparative example, the FePt capping layer 73 is not included, and the total film thickness of the magnetic recording layer 14 is 4 nm.

Table 4 shows the RMS surface roughness in Embodiments 4-1 and 4-2 and Comparative examples 2 and 3 and results of recording and reproducing evaluation according to the method of Embodiment 1.

TABLE 4

|  | RMS surface roughness (nm) | Recording bit length (nm) | Recording width (nm) | Estimated areal recording density (Gbits/cm²) |
|---|---|---|---|---|
| Embodiment 4-1 | 0.54 | 22.2 | 55 | 162 |
| Embodiment 4-2 | 0.31 | 17.8 | 48 | 231 |
| Comparative example 2 | 1.12 | 28.2 | 54 | 119 |
| Comparative example 3 | 1.05 | 31.7 | 51 | 112 |

Embodiment 4-1 has a relatively favorable RMS surface roughness even without the FePt capping layer 73, and is apparently superior in high density recording characteristics to Comparative examples. In comparison with the Comparative example 2, it has become apparent that application of $SiO_2$ to the second FePt granular magnetic layer, which is close to the surface, improves the surface flatness of the granular magnetic layer.

In the case of Comparative example 3, $SiO_2$ is applied to the first FePt granular magnetic layer 71, and C is applied to the second FePt granular magnetic layer, which is close to the surface. In this case, significant improvement in surface flatness as with Embodiment 4-1 is not obtained. Accordingly, in order to improve the surface flatness, it is significantly preferable to apply $SiO_2$ to the second FePt granular magnetic layer, which is close to the surface. In Comparative example 3, the high density recording characteristics deteriorates even though the RMS surface roughness is lower than that in Comparative example 2. It is expected that this is because addition of $SiO_2$ to the first FePt granular magnetic layer 71 causes the isolation of FePt magnetic alloy grains to deteriorate in comparison with the case of adding C.

In Embodiment 4-2, the FePt capping layer is further applied to the structure in Embodiment 4-1, which can improve the surface flatness only with the FePt granular magnetic layer. In this case, a synergetic effect can further reduce the RMS surface roughness, and obtain an estimated areal recording density of 231 Gbits/cm², which is the maximum value.

In this embodiment, the amount of addition of the non-magnetic material added to the FePt granular magnetic layer is 35 vol. %. However, the amount of addition of the non-magnetic material is not limited thereto. Instead, the amount in a range between 20 and 55 vol. %, which is suitable for forming the FePt granular magnetic layer, can also obtain an equivalent advantageous effect.

The present invention is not limited to the above embodiments, but includes various modifications. For instance, the embodiments have been described in detail for the sake of illustrating the present invention for the sake of clarity, and do not necessarily limit the scope to those including the entire configuration. Further, a part of the configuration of one of the embodiments can be replaced with that of another embodiment. Moreover, the configuration of one of the embodiments further includes configurational elements of another embodiment. A part of the configuration of each embodiment can be subjected to addition, deletion and replacement of another configuration.

| DESCRIPTION OF SYMBOLS | |
|---|---|
| 11 | heat-resistant glass substrate |
| 12 | Ni—Ta alloy layer |
| 13 | MgO layer |
| 14 | magnetic recording layer |
| 15 | carbon overcoat layer |
| 16 | liquid lubrication film |
| 21 | FePt granular magnetic layer |
| 22 | FePt capping layer |
| 51 | main magnetic writer pole |
| 52 | near field light emitting element |
| 53 | waveguide |
| 54 | magnetic reproducing element |
| 55 | slider body |
| 56 | near field light |
| 57 | magnetic recording medium |
| 71 | first FePt granular magnetic layer |
| 72 | second FePt granular magnetic layer |
| 73 | FePt capping layer |

What is claimed is:

1. A magnetic recording medium including a non-magnetic substrate and at least a magnetic recording layer formed thereon, wherein
the magnetic recording layer comprises a plurality of magnetic layers each including a magnetic alloy whose principal material is Fe and Pt and at least one non-magnetic material selected from the group consisting of carbon, oxide and nitride,
a first magnetic layer disposed at a layer relatively close to the substrate has a granular structure in which magnetic alloy grains including an FePt alloy as a principal material are separated from grain boundaries including the non-magnetic material as a principal material, and
a second magnetic layer disposed closer to a surface than the first magnetic layer and has a homogeneous non-granular structure in which an FePt alloy and the non-magnetic material are mixed with each other in a state of mixture finer than diameters of the FePt magnetic alloy grains in the first magnetic layer.

2. The magnetic recording medium according to claim 1, wherein a dosage per volume of the non-magnetic material added to the first magnetic layer is between 20 and 55 vol. %.

3. The magnetic recording medium according to claim 1, wherein the non-magnetic material added to the second magnetic layer is carbon, and a dosage per volume thereof is between 7 and 18 vol. %.

4. The magnetic recording medium according to claim 1, wherein the non-magnetic material added to the second magnetic layer is an oxide or a nitride, and a dosage per volume thereof is between 11 and 32 vol. %.

5. The magnetic recording medium according to claim 1, wherein the first magnetic layer is formed on a preheated substrate by film deposition, the second magnetic layer is formed by film deposition on the substrate cooled to a temperature lower than that in the film deposition of the first magnetic layer, and a post annealing process is subsequently performed.

6. The magnetic recording medium according to claim 1, wherein the first magnetic layer includes two stacks of magnetic layers each of which has a granular structure in which magnetic alloy grains including an FePt alloy as a principal material are separated from grain boundaries including the non-magnetic material as a principal material, and the magnetic layer disposed closer to the substrate between the two stacks of magnetic layers has a higher dosage of carbon as the non-magnetic material and smaller dosages of the oxide and the nitride other than the carbon in comparison with the magnetic layer disposed closer to the surface.

7. The magnetic recording medium according to claim 1, wherein the FePt alloy in the magnetic recording layer includes an Ag element.

8. A magnetic recording medium including a non-magnetic substrate and at least a magnetic recording layer formed thereon,
wherein the magnetic recording layer comprises a plurality of magnetic layers each including a magnetic alloy whose principal material is Fe and Pt and at least one non-magnetic material selected from the group consisting of carbon, oxide and nitride,
each of a first magnetic layer disposed closer to a substrate and a second magnetic layer disposed closer to a surface than the first magnetic layer has a granular structure in which magnetic alloy grains including an FePt alloy as a principal material are separated from grain boundaries including the non-magnetic material as a principal material, and
the first FePt granular magnetic layer includes a higher dosage of carbon as the non-magnetic material and smaller dosages of the oxide and the nitride other than the carbon in comparison with the second FePt granular magnetic layer.

9. The magnetic recording medium according to claim 8, wherein the magnetic recording layer further includes a third magnetic layer disposed closer to the surface than the second magnetic layer, and
the third magnetic layer has a homogeneous non-granular structure in which an FePt alloy and the non-magnetic material are mixed with each other in a state finer than diameters of the FePt magnetic alloy grains in the first magnetic layer and the second magnetic layer.

10. The magnetic recording medium according to claim 8 wherein the FePt alloy in the magnetic recording layer includes an Ag element.

* * * * *